United States Patent [19]
Cole et al.

[11] Patent Number: 5,075,038
[45] Date of Patent: Dec. 24, 1991

[54] ELECTRICALLY CONDUCTIVE SILICONE COMPOSITIONS

[75] Inventors: Richard L. Cole, Bay City; Michael A. Lutz, Midland, both of Mich.

[73] Assignee: Dow Corning Corporation, Midland, Mich.

[21] Appl. No.: 546,479

[22] Filed: Jun. 29, 1990

[51] Int. Cl.⁵ .............................................. H01B 1/06
[52] U.S. Cl. .................................. 252/514; 524/439; 252/512; 252/518; 252/513; 252/519
[58] Field of Search ............... 252/514, 512, 518, 513, 252/518, 519; 524/439

[56] References Cited

U.S. PATENT DOCUMENTS

| | | | |
|---|---|---|---|
| 3,140,342 | 4/1964 | Ehrreich et al. | 174/35 |
| 3,576,387 | 6/1971 | Derby | 174/36 |
| 4,011,360 | 3/1977 | Walsh | 428/402 |
| 4,051,454 | 10/1977 | Leiser et al. | 358/328 |
| 4,250,075 | 2/1981 | Monroe et al. | 260/33.6 |
| 4,695,404 | 9/1987 | Kwong | 252/514 |
| 4,777,205 | 10/1988 | Scola et al. | 252/514 |
| 4,820,446 | 4/1989 | Prud'Homme | 252/514 |
| 4,822,523 | 4/1989 | Prud'Homme | 252/514 |

OTHER PUBLICATIONS

"Development of Electronic Conduction in Silver-filled Epoxy Adhesives", A. J. Lovinger; J. Adhesion, 1979, vol. 10, pp. 1–15.

Primary Examiner—Josephine Barr
Attorney, Agent, or Firm—Edward C. Elliott

[57] ABSTRACT

Improved silicone electrically conductive compositions can be prepared by using a polysiloxane which contains greater than 5 mole percent of the silicon atoms having an aromatic containing radical such as a phenyl radical attached, or having greater than 5 mole percent ethylenically unsaturated hydrocarbon radical such as vinyl radicals, or having greater than 5 mole percent aromatic containing radical such as phenyl and ethylenically unsaturated hydrocarbon radical such as vinyl radicals in combination, in combination with from 12.5 to 50 volume percent of the total composition of silver particles or particles having an outer surface of silver. The composition has an electrical resistivity of less than $1 \times 10^{-2}$ ohm-cm and the electrical resistivity is stable to thermal aging.

16 Claims, No Drawings

ELECTRICALLY CONDUCTIVE SILICONE COMPOSITIONS

This is a continuation-in-part of copending application Ser. No. 07/267,412 filed on Nov. 4, 1988 now abandoned.

BACKGROUND OF THE INVENTION

1. Field of the Invention

This invention relates to silicone compositions which are made electrically conductive through the addition of metal particles.

2. Background Information

The electronic industry uses electrically conductive adhesives to attache silicon chips to a substrate. Metal alloys find use in this application, but they require very high temperatures during processing to achieve flow out and bonding, are expensive, and have a very high modulus. Epoxy resins filled with silver particles have found use in this application. The filled epoxies ar easier to process and for along time provided the microelectronic industry with acceptable performance. Silver filled epoxies are, however, rigid materials having a high modulus. With the current trend toward larger devices there is a need for the electrically conductive adhesive to provide stress-relief. Otherwise, during thermal cycling, the device and/or the substrate can crack and fail due to induced stresses. The high modulus epoxies do not provide this stress relief. Additionally, the microelectronic industry has beed for high reliability devices. Current silver filled epoxies typically do not possess the purity to satisfy these needs. In addition, a suitable composition must adhere to the components, have a volume resistivity of less than $10^{-2}$ ohm-cm, remain stable over a temperature range, and maintain electrical conductivity during aging at elevated temperatures.

U.S. Pat. No. 3,140,342, issued July 7, 1964, teaches that effective seals for electrical closures can be formed from a compressible or resilient plastic loaded or filled with metal particles. When the metal particles are a noble metal of an average particle size in the range of 0.1 to 20 micrometers, and present in the range of 20 to 66 volume percent, the gasket formed can have an electrical resistance of less than $10^{-3}$ ohm-cm.

U.S. Pat. No. 3,576,387, issued Apr. 27, 1971, related to heat shrinkable electromagnetic shields teaches the addition of silver plated copper powder having an average particle size of from 2 to 3 micrometers into a silicone, pressure-sensitive adhesive.

A discussion of the use of silver particles in epoxy adhesives in the article, "Development of Electrical Conduction in Silver-filled Epoxy Adhesives", A. J. Lovinger; J. Adhesion, 1979, Vol. 10, pp 1-15, Gordon and Breach Science Publishers Ltd., shows that there is no conduction using silver flakes unless the adhesive is cured at elevated temperature.

An electrically conductive stock useful for electromagnetic shielding is disclosed in U.S. Pat. No. 4,011,360, issued Mar. 8, 1977. The stock comprises a mixture of siloxane polymer, an aminosilane or aminosilazane curing agent and electrically conductive particles having an outer surface of noble metal. This patent teaches that other curing systems may not be successful.

Adhesives are taught in U.S. Pat. No. 4,051,454, issued Sept. 27, 1977, based upon vinyl containing organopolysiloxanes, organopolysiloxanes having Si-bonded hydrogen atoms and catalysts which promote the addition of the Si-bonded hydrogen atoms to the vinyl groups. The adhesives may be combined with conductive carbon black, graphite and powdered metals, such as copper, aluminum and-or silver to give electrical conductivity, in amounts generally of form 0.05 to 3 percent by weight.

U.S. Pat. No. 4,250,075, issued Feb. 10, 1981 teaches compositions which cure to electrically conductive silicone elastomers. The composition is required to contain greater than 15 percent by weight of carbonaceous particles and greater than 2 percent by weight of phenyl radicals. The useful life of an ignition cable made with the composition is stated to be dependent upon the amount of phenyl radical present.

U.S. Pat. No. 4,695,404, issued Sept. 22, 1987 teaches a polymeric composition having an electrical resistivity in the used state of no more than $10^{-4}$ ohm-cm. The composition comprises a polymer chosen from an epoxy resin, silicone, fluorosilicone, polyurethane, or long chain hydrocarbon filled with from 70 to 90 percent by weight of silver particles in the form of flakes having a volume electrical resistivity in a compressed free flow state of not more than $2 \times 10^{-4}$ ohm-cm. The composition has a stable volume electrical resistivity of 0.00001 ohm-cm or less.

There is not teaching in this art as to how to select the silicone component of the composition so as to obtain the maximum electrical conductivity in a metal filled composition.

There is no teaching in the art as to how to choose a silicone composition so as to obtain a high electrical conductivity which is retained upon aging at elevated temperatures.

SUMMARY OF THE INVENTION

A silicone composition which is electrically conductive due to the presence of silver particles, or particles whose outer surface is silver, can be increased in electrical conductivity through the use of a silicone polymer which includes certain critical amounts of aromatic containing radicals such as phenyl radicals, or which contains ethylenically unsaturated hydrocarbon radicals such as vinyl radicals, or which contains both phenyl radicals and vinyl radicals; the vinyl radicals being in addition to the vinyl radicals commonly used as endblockers in polydiorganosiloxane polymers which are cured through an addition reaction with an organohydrogesiloxy containing compound in the presence of a platinum catalyst.

DESCRIPTION OF THE INVENTION

This invention relates to an electrically conductive silicone composition comprising (A) silicone polymer having greater than 5 percent of the silicon atoms having an aromatic containing radical attached, or having greater than 5 mole percent ethylenically unsaturated hydrocarbon radicals, or having greater than 5 mole percent aromatic containing radicals and ethylenically unsaturated hydrocarbon radicals in combination, (B) from 125 to 50 volume percent of the total composition of silver particles or particles having an outer surface of silver, said composition being free of carbon black, said composition having an electrical resistivity of less than $1 \times 10^{-2}$ ohm-cm, and which electrical resistivity is stable to thermal aging. The composition can also contain carbon black as an ingredient.

This invention relates to an electrically conductive silicone composition comprising (A) silicone polymer having greater than 5 percent of the silicon atoms having a phenyl radical attached, or having greater than 5 mole percent vinyl radicals, or having greater than 5 mole percent phenyl and vinyl radicals in combination, said polymer being curable through an addition reaction with a silicon hydride in the presence of a platinum catalyst, (B) from 12.5 to 50 volume percent of the total composition of silver particles or particles having an outer surface of silver, said composition being free of carbon black, and having an electrical resistivity of less than $1 \times 10^{-2}$ ohm-cm, and which electrical resistivity is stable to thermal aging.

The preparation of silicone compositions which are electrically conductive through the introduction of carbon particles are metallic particles has been known. It has now been discovered that the electrical conductivity of silicone compositions, which are electrically conductive due to the presence of silver particles or particles whose outer surface is silver, can be increased, or the electrical resistivity decreased, by the proper selection of the silicone polymer which is used. By increasing the ehtylenically unsaturated hydrocarbon content or the aromatic content, or both, of the silicone polymer, the electrical conductivity is increased. A preferred method increased the phenyl radical content or the vinyl radical conetent or both. Additionally, the electrical conductivity is retained to a higher degree upon thermal aging.

The silicone polymer of this invention can be either a material which cures to a crosslinked state or a material which does not cure. The silicone polymer can be one which cures to give a resinous material or one which cures to give an elastomeric material. Since one of the uses of electrically conductive silicone compositions is as a bonding agent for adhering integrated circuit chips to a substrate, a preferred polymer is one which cures to an elastomer, thereby providing stress relief to the composite when the composite is cycled through a temperature range, The only requirement for the silicone polymer is that the it contain the required amount of phenyl or vinyl groups so that improved electrical conductivity results in the silver containing composition.

The silicone polymer of this invention includes silicone polymer having units of the formula $R_aSiO_{4-a/2}$ where R is a hydrocarbon radical and a is from 0 to 3 inclusive, with greater than 5 mole percent of the R radicals being aromatic containing radicals or ethylenically unsaturated hydrocarbon radicals, or aromatic containing radicals and ethylenically unsaturated hydrocarbon radicals in combination.

One of the silicone polymers found suitable for use in compositions of this invention is a resinous material having a general average formula $(R^1R^2R^3SiO_{\frac{1}{2}})_a(SiO_{4/2})_b$, where each $R^1$, $R_2$, and $R^3$ is a hydrogen atom or amonovalent hydrocarbon radical, and the ratio of a/b is from 0.2/1 to about 4/1. A description of these polymers and their method manufacture is found in U.S. Pat. No. 4,707,531, issued Nov. 17, 1987, which patent is hereby incorporated by reference to show such polymers and their method of manufacture.

A preferred composition which can be cured to a resin is a silicone polymer having the generic formula: $(Me_2ViSiO_{\frac{1}{2}})_{0.42}(Me_3SiO_{178})_{1.38}(SiO_2)_{1.0}$, where Me is methyl Vi is vinyl, and Si is silicon. The method of preparation of this resin is as shown in the above referenced patent.

A preferred silicone polymer which can be cured to an elastomer has the generic formula: $(Me_2ViSiO_{178})_{0.42}(Me_2SiO)_{103}(MePhSiO)_{45}$, where Ph is phenyl. The method of preparation of polydiorganosiloxanes is well known. For example, one method consists of the equilibration of the appropriate octoorganotetracyclosiloxanes and hexaorganodisiloxane endblocker in the presence of a potassium catalyst, neutralization, and stripping under vacuum to give the polymer.

If the polymer chosen for use in the compositions of this invention are of a fluid viscosity, compositions can be prepared which are of a low enough viscosity that they can be easily applied without using any solvent as a diluent. It is preferred than no solvent be used in the compositions of this invention. When the composition is to be used as a curable adhesive for example, it is possible to make an easily spreadable material which cures without the release of any volatile materials. It is thus very useful for adhering two non porous surfaces together.

The compositions of this invention are electrically conductive due to the presence in the composition of from 12.5 to 50 volume percent of the total composition of silver particles or particles having an outer surface of silver. There are many types of particles available commercially which can provide electrical conductivity. It is recognized that a majority of the electrical conductivity of particles is available as long as the surface is very conductive, such as when the surface is silver. In the interest of economy, there are available particles such as copper, solid glass, hollow glass, mica flakes, nickel granules and spheres, short glass and ceramic fibers, having average particle diameters in the range of from 15 to 100 micrometers, which are coated with a layer of silver. There are also available particles of silver in the form of powders having average particle diameters in the range of from 0.5 to 20 micrometers. The particles which have been flattened into flakes of the same sizes. Silver is the conductive metal of choice because it resists oxidation, even in small particle sizes and provides the required degree of electrical conductivity. Metals which oxidize, such as copper, do not give useful levels of conductivity after the surface of the particles oxidizes. Since the compositions of this invention are intended to be highly conductive, the preferred particles having an outer surface of silver are the solid silver particles, most preferably in the form of flakes. The preferred amount of silver flakes is form 20 to 25 volume percent. Below this value, the conductivity is lower than desired. Above this value, the viscosity increases considerably, and the additional conductivity is obtained at a great increase in cost.

Silver powders are ordinarily produced by chemical precipitation, electrolytic deposition, or cementation. The powder produced can be characterized by the average particle diameter, apparent density and tap density. The powders ar very high purity with a clean surface. When flakes are produced, the powder is mixed with a solvent and a lubricant, then fed into a grinding or milling device to from the powder into a thin flake. The lubricant is added to prevent the silver powder form cold welding or forming large agglomerates. After milling, the solvent and lubricant are washed off and the flake is dried. A portion of the milling agent remains chemisorbed on the silver surface.

When the composition of this invention is to be used in a curable system, a preferred method of curing is through the use of a silicon hydride crosslinker and a noble metal catalyst.

Liquid organosiloxane compositions that cure to form elastomeric materials by a platinum-catalyzed hydrosilation reaction typically include at least one diorganopolysiloxane containing two or more vinyl or other ethylenically unsaturated hydrocarbon radicals per molecule, an organohydrogensiloxane, and a platinum catalyst.

As used in this specification the term "ethylenically unsaturated hydrocarbon radical" encompasses hydrocarbon radicals containing at least one non-aromatic double or triple bond between adjacent carbon atoms.

The curing agent is an organohydrogensiloxane containing an average of two or more silicon bonded hydrogen atoms per molecule. This ingredient contains form as few as four silicon atoms per molecule up to an average of 20 or more, and can have a viscosity of up to 10 Pa.s or higher at 25° C. The repeating units of the organohydrogensiloxane include but are not limited to $HSiO_{1.5}$, $R^4HSiO$ and/or $R^4{}_2HSiO_{0.5}$ in addition to one or more of monoorganosiloxy, diorganosiloxane, triorganosiloxy and $SiO_{4/2}$ units. In these formulae $R^4$ represents a monovalent hydrocarbon or halohydrocarbon radical, preferrably of 6 carbon atoms or less, with the proviso that $R^4$ cannot represent an ehtylenically unsaturated hydrocarbon radical.

Alternatively the organohydrogensiloxane can be a cyclic compound containing diorganosiloxane and organohydrogensiloxane units or a compound of the formula $Si(OSiR^4{}_2H)_4$. The preferred curing agent is a linear trimethylsiloxy terminated dimethylsiloxane/methylhydrogensiloxane copolymer containing an average of from 10 to about 50 repeating units per molecule, of which from 3 to 5 are methylhydrogensiloxane, or a compound of the formula $Si(OSiR^4{}_2H)_4$ where $R^4$ is lower alkyl, most preferably methyl.

The molar ratio of silicon bonded hydrogen atoms to vinyl or other ethylenically unsaturated hydrocarbon radicals in compositions curable by a hydrosilylation reaction is critical with respect to the properties of the cured elastomer, The optimum ratio for the present curable compositions will be determined at least in part by the molecular weight of ingredient (A). This optimum value can readily be determined by those skilled in the art with a minimum of experimentation, and is not part of this invention.

Hydrosilylation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70 degrees C.

The platinum containing catalyst can be present in an amount equivalent to as little as one part by weight of platinum per one million parts of curable composition. Catalyst concentrations equivalent to from 5 to 200 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70°0 C. or above to cure at a practical rate.

If it is desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory working time while not adversely affecting cure rate. In other instances inhibitor concentrations of up to 500 or more moles of inhibitor per mole of platinum are required. The optimum concentration for a given inhibitor in a given composition can readily be determined by routing experimentation an does not constitute part of this invention.

Small amounts of additives can be included in the composition for modifying the color and physical properties of the composition. Typical additives include but are not limited to pigments, dyes, adhesion promoters, flame retardants, heat and/or ultraviolet light stabilizers and resinous organosiloxane copolymers to enhance the physical properties of the cured elastomer. Filler such as fumed silica can be added to improve the physical strength of the composition when cured. The effect of added material must always be evaluated to make sure that the electrical conductivity of the composition is not effected adversely.

Suitable methods of mixing the compositions of this invention are well known to those experienced in the art. A preferred process weighs the polymer into a container, then weighs and mixes in the remaining liquid ingredients. The silver particles are then stirred and mixed into the composition until a uniform composition results. The mixing can be simple, such as stirring with a spatula or paddle, or it can involve the use of a mixer, such as a Baker-Perkins mixer, a Ross mixer, or a three roll mill. When the silicone composition is of the type in which the components are stored as two parts, each part is made as above, then mixed together before use.

To facilitate measuring the blending quantities of two-part compositions that constitute a preferred embodiment of this invention, both of these parts preferably include a portion of the total amount of silicone polymer.

A preferred composition comprises a silicone copolymer which is cured through the reaction of vinyl groups present in the polymer reacting with hydrogen atoms attached to silicon present in a crosslinking agent in the presence of a platinum catalyst. The composition is prepared as a two part system for storage, then is combine at the time of use. The curing reaction does not give off any byproducts, so there is no tendency to develop porosity in the cured composition, nor is there a need for the curing composition to be under pressure during cure. These are characteristics which are desirable in most cases where an electrically conductive composition is being used to adhere two pieces together or where it is used as a coating to give a surface electrical conductivity. The silver particles used in the composition are preferably silver flakes since it takes a plower weight of flakes than of powder to obtain a given level of electrical conductivity. When it is desired to use this system and cure at room temperature, the silver particles or particles having an outer surface of silver must be free of any organic processing aids. Since silver powder is readily available with a clean surface, it is the preferred material for use when cure at room temperature is desired.

The ratio of silicone polymer to silver particles is conveniently measured by weight, but the important ratio is the volume ratio as a critical volume of silver particles must be present to impart electrical conductivity. A conversion can be calculated on the basis of a specific gravity of silver of 10.5 and of silicone polymer of 1.0 as follows:

| Weight percent silver | Volume percent silver |
|---|---|
| 91.3 | 50.0 |
| 90 | 46.2 |
| 85 | 37.6 |
| 80 | 35.1 |
| 75 | 22.2 |
| 70 | 18.2 |
| 65 | 15.0 |
| 60 | 12.5 |

The compositions of this invention will find use as electrically conductive adhesives, coatings, films, and such. The compositions of this invention which cure to elastomers are particularly suitable for use with large integrated circuits for bonding where electrical conductivity is required and where the stress relief properties of the elastomeric material is desirable.

The following examples are included for illustrative purposes only and should not be construed as limiting the invention when is properly set forth in the appended claims.

EXAMPLE 1

A series of compositions were prepared using silicone polymers having varying amounts of phenyl radical. E7340-85 Composition 1 was prepared by stirring together 12.375 gm of silver particles in the form of mechanically flattened flakes having atypical particle size distribution of from 0.5 to 10 micrometers and a weight loss at 1000° F. of 0.65 percent. (Silflake 282 from Handy and Harman, Fairfield, Conn.), 2.295 gm of dimethylvinylsiloxy endblocked polydimethylsiloxane having a degree of polymerization (Dp) of about 150, and 0.33 gm of chloroplatinic acid complex of divinyltetramethyldisiloxane diluted with dimethylvinylsiloxy endblocked polydimethylsiloxane to provide 0.7 weight percent platinum to give a base material. A curing agent was prepared by mixing 3.195 gm of the dimethylvinylsiloxy endblocked polydimethylsiloxane, 1.92 gm of adhesion additive, and 4.88 gm of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent. Ten parts of the base was then mixed with one part of the curing agent to give a curable composition, containing a polymer having no phenyl radicals and having 75 percent by weight (22.2 percent by volume) silver particles, This is a comparative composition.

The curable composition was made into test samples. A test sample for measuring electrical resistivity was prepared by first placing 2 strips of 3M Miracle Scotch Tape down the length of the surface of glass microscope slide with a spacing of 0.125 inch between them. A portion of the test composition was placed at one end of the space and then spread out by drawing a single edge razor blade held at a 45 degree angle over the tape and the sample so that the sample was distributed evenly into the space between the tape strips and equal to the thickness of the tape strips (0.002 inch). The tape was then removed and the sample cured by placing in a forced air oven for 1 hour at 150° C. The electrical resistance was then measured by use of a four pole resistance bridge. A variable DC power supply was used to provide a current through the length of the sample. A digital multimeter was then used to measure the voltage drop between two electrodes on the surface of the sample with a measured length of 0.719 inch between them. The volume resistivity was then calculated according to the formula:

$$\text{Volume Resistivity} = \left(\frac{V}{I}\right)\left(\frac{\text{width} \times \text{thickness}}{\text{length}}\right)$$

where V is the voltage and I is the current. Three glass slides were prepared for each test and the voltage measured at 10, 20, and 40 milliamperes. The values were then averaged, with the result shown in Table I. After measuring the electrical resistance after cure for 1 hour at 150° C., the slides were thermally aged at 200° C. for 40 hours and the electrical resistance measured again, with the result shown in Table I. The samples were aged an additional 21 hours at 200° C. and again tested.

The adhesives of the samples was measured by preparing lap shear specimens. Two pieces of Alclad 2024T3 aluminum 1 inch by 3 inches were cleaned by wiping with isopropyl alcohol, then placed in a jig so that they overlapped for one inch of their length, with a portion of the composition to be tested between them so as to bond the two pieces together. The glue line was 0.025 inch thick. The jig was then placed in a force air oven for 2 hours at 150° C. to cure the lap shear specimens. The samples were removed, cooled for a minimum of 4 hours, and tested for adhesive strength by pulling them apart in a longitudinal direction. The average load required to obtain failure of the bond is shown in Table 1.

Composition 2 was prepared by first mixing a part A consisting of 10 gm of the silver particles of composition 1, 2.77 g of dimethylvinylsiloxy endblocked inorganosiloxane random copolymer having dimethylsiloxy units an methylphenylsiloxy units in a ratio so that there was 10 mole percent of methylphenylsiloxy units and having a Dp similar to composition 1, 0.53 gm of the platinum containing catalyst of composition 1, and 0.03 of 2-methyl-3-butyn-2-ol cure inhibitor.

Part B was prepared by mixing 10 gm of the silver particles, 1.8 gm of the phenyl containing copolymer of part A, 0.47 gm of adhesion promoter, and 1.05 gm of the methylhydrogen copolymer of composition 1. Part A and Part B were then combined to give a curable composition having 10 mole percent phenylmethylsiloxy in the polymer and having 75 percent by weight silver particles. The composition was prepared into test samples and tested in the same manner as composition 1.

Composition 3 was prepared and tested in the same manner as composition 2, except the phenyl containing copolymer had 30 mole percent methylphenylsiloxy groups.

Composition 4 was prepared an tested in the same manner as composition 2, except the phenyl containing copolymer had 50 mole percent methylphenylsiloxy groups.

The test results are shown in Table I. The results show that as the amount of phenyl radical was increased, the electrical resistivity decreased and the stability of the electrical resistivity upon heat aging increased.

50 percent methylphenylsiloxy units, was increased, the electrical resistivity decreased.

TABLE II

| Comp'n | Phenyl Units | Vinyl Units | Electrical 1 hr/150° C. | Resistance, 4 hr/200° C. | ohm-cm 25 hr/200° C. |
|---|---|---|---|---|---|
| 21 | 0 | 0 | 0.0035 | 0.0058 | 0.010 |
| 22 | 50 | 0 | 0.00028 | 0.00022 | 0.00023 |
| 23 | 50 | 0.67 | 0.00021 | 0.00020 | 0.00020 |
| 24 | 50 | 2.5 | 0.00014 | 0.00014 | 0.00013 |

Phenyl units are the mole percent methylphenylsiloxy vinyl units are the mole percent methylvinylsiloxy units in addition to the endblocker of dimethylvinylsiloxy units.

EXAMPLE 3

A series of samples were prepared which illustrate the ability of additional vinyl content to lower the electrical resistivity.

Composition 31 was prepared by mixing a part A of 10 gm of the silver particles of Example 1, 1.39 gm of dimethylvinylsiloxy endblocked polydimethylsiloxane having a Dp of about 500, and 1.39 gm of dimethylvinylsiloxy endblocked polydimethylsiloxane having aDp of about 300 to give an average of about 400, 0.53 gm of the platinum catalyst of composition 1 of Example 1, and 0.03 gm of the cure inhibitor of composition 2 of Example 1. Part B was prepared by mixing 10 gm of the silver particles, 0.96 gm of each of the polymers of part A, 0.95 gm of the methylhydrogen copolymer of composition 1, and 0.46 gm of the adhesion additive of composition 1. Part A and part B were combined into a curable composition and test samples were prepared and tested as in Example 1 with the results shown in Table III.

TABLE I

| Composition | Mole Percent Phenyl | Electrical 1 hr/150° C. | Resistance, 4 hr/200° C. | ohm-cm 25 hr/200° C. | Composition | Lap Shear Pounds |
|---|---|---|---|---|---|---|
| 1* | 0 | 0.00238 | 0.0043 | 0.0102 | 1* | 354 |
| 2 | 10 | 0.0007 | 0.00089 | 0.0011 | 2 | 165 |
| 3 | 30 | 0.00037 | 0.00036 | 0.00038 | 3 | 143 |
| 4 | 50 | 0.00026 | 0.00025 | 0.00026 | 4 | 92 |

*comparative composition

EXAMPLE 2

A series of samples were prepared to determine the effect of using copolymers having increasing vinyl content in addition to containing phenyl radicals.

Composition 21 was made in the same manner as composition 1 of Example 1, except the copolymer had a Dp of about 300. This is a comparative composition.

Composition 22 was made in the same manner as composition 4 of Example 1, except the copolymer had a Dp of about 300.

Composition 23 was made in the same manner as composition 22, except the copolymer contained 2 pendant vinyl groups per molecule in addition to the terminal vinyl groups. The vinyl groups replaced methyl groups, so the copolymer was still 50 mole percent methylphenylsiloxy units.

Composition 24 was made in the same manner as composition 23, except 20 percent of the copolymer was replaced with a copolymer containing 50 pendant vinyl groups per molecule in addition to the terminal vinyl groups and it had an average Dp of about 500.

Each composition was prepared into test samples and tested in the same manner as in Example 1, with the results shown in Table II. The results show that as the amount of vinyl radical in the copolymers, containing Composition 32 was prepared by mixing a base of 12.375 gm of the silver particles of Example 1, 2.295 gm of the polydimethylsiloxane having a Dp of about 300 of composition 31 of Example 3, and 0.33 gm of the platinum catalyst of composition 1 of Example 1. A curing agent was prepared by mixing 3.575 gm of the polymer used in the base, 4.5 gm of the methylhydrogen copolymer of composition 1, and 1.92 gm of adhesion additive of Example 1. A curable composition was then prepared by mixing 10 parts of the as with 1 part of the curing agent.

Composition 33 was prepared in the same manner as composition 32, except the polymer was one in which the Dp was about 150.

Composition 34 was prepared by mixing a part A of 10 gm of the silver particles of Example 1, 2.77 gm of dimethylvinylsiloxy endblocked polydimethylsiloxane having about 7 dimethylsiloxane units per molecule, 0.53 gm of the platinum catalyst of composition 1, and 0.03 gm of the cure inhibitor of composition 2. Part B was prepared by mixing 10 gm of the silver particles, 1.05 gm of the polymer of part A, 1.81 gm of the methylhydrogen copolymer of composition 1.Part A and part B were combined by mixing 1 part of A with 2 part of B by weight.

The results in Table III show that as the length of the dimethylvinylsiloxy endblocked polydimethylsiloxane is decreased, thereby increasing the vinyl content, the electrical resistivity of the cured composition is lowered and the stability of the electrical resistivity upon heat aging is improved.

TABLE III

| Comp'n | Polymer Dp | Mole Percent Vinyl | Electrical 1 hr/150° C. | Resistance, 4 hr/200° C. | ohm-cm 25 hr/200° C. |
|---|---|---|---|---|---|
| 31 | 400 | 0.5 | 0.0070 | 0.126 | 14.2 |
| 32 | 300 | 0.67 | 0.0035 | 0.0058 | 0.01 |
| 33 | 150 | 1.33 | 0.0024 | 0.0043 | 0.01 |
| 34 | 7 | 22.2 | 0.00052 | 0.0006 | 0.0006 |

EXAMPLE 4

A series of compositions were prepared using a silicone polymer having 30 mole percent methylphenylsiloxy units.

Composition 41 was prepared by stirring together 7.5 gm of the silver particles of Example 1, 2.08 gm of the copolymer of composition 3, 0.40 gm of the platinum catalyst of composition 1, and 0.02 gm of the cure inhibitor of composition 2 to give part A. Part B was prepared by mixing 7.5 gm of the silver particles, 9.98 gm of the copolymer, 0.50 gm of adhesion additive of composition 1, and 1.0 gm of the methylhydrogen copolymer of composition 1. Then part A and part B were mixed together to give a curable composition having a polymer comprising 30 mole percent methylphenylsiloxy units and 75 percent by weight silver flakes.

Composition 42 was prepared from the same ingredients as composition 41, but adding fumed silica. A mix was first made of 92.76 parts of the copolymer and 7.24 parts of fumed silica having a surface area of about 250 m²/gm. Part A was then prepared by mixing 7.38 gm of the silver flake, 1.7 gm of the copolymer/silica mix, 0.4 gm of the platinum catalyst, 0.02 gm of the cure inhibitor of composition 2, and 0.5 gm of adhesion additive of composition 1. Part B was prepared by mixing 7.38 gm of the silver particles, 1.62 gm of the copolymer/silica mix, and 1.0 gm of the methylhydrogen copolymer of composition 1. Then parts A and B were mixed together to give a curable composition having 73.8 percent by weight silver flake, 1.2 percent by weight fumed silica and 15.4 percent by weight copolymer.

Composition 43 was prepared using both silver flakes and silver powder, in conjunction with the ingredients of composition 41. Part A was prepared by mixing 138 gm of the silver flakes of composition 1, 42 gm of silver powder having an average particle diameter of from 0.5 to 0.8 micrometers (Silpowder 33 1from Handy and Harman, Fairfield, Conn.), 49.92 gm of the copolymer, 9.6 gm of the platinum catalyst, and 0.48 gm of the cure inhibitor of composition 2. Part B was prepared by mixing 84 gm of the silver flakes, 96 gm of the silver powder, 23.95 gm of the copolymer, 12 gm of adhesion additive of composition 1 of Example 1, and 24.05 gm of the methylhydrogen copolymer of composition 1 of Example 1. Then parts A and B were mixed together in a 1 to 1 weight ratio to give a curable composition having 46.25 percent by weight silver flake, 28.75 percent by weight silver powder, and 15.4 percent by weight polymer.

Composition 44 was composition 43 tested after 8 weeks aging at room temperature, then preparing the test sample.

Each composition was prepared into test samples and tested in the same manner as in Example 1, with the results shown in Table IV.

The results demonstrate the use of silica as a thixotropic agent and the ability to use silver powder to obtain highly conductive materials.

TABLE IV

| Comp'n | Electrical 1 hr/150° C. | Resistance, 4 hr/200° C. | ohm-cm 25 hr/200° C. |
|---|---|---|---|
| 41 | 0.00029 | 0.00029 | 0.00033 |
| 42 | 0.00031 | 0.00031 | 0.00033 |
| 43 | 0.00036 | 0.00035 | 0.00042 |
| 44 | 0.00045 | 0.00050 | 0.00057 |

EXAMPLE 5

A polymer was prepared having 50 mole percent methylphenylsiloxy radical to compare with the polymer used in example 4 having 30 mole percent of this radical.

A copolymer was prepared by adding 33.57 gm of dimethylvinyl endblocked polydimethylsiloxane having about 7 dimethylsiloxy units, 500.93 gm of dimethydcyclosiloxane fluid, and 965.5 gm of methylphenylcyclosiloxane to a 3-necked flask equipped with a stirrer, thermometer, condenser, and nitrogen purge. Then 3.54 gm of potassium silanolate and 7.5 gm of dimethylformamide were added and a slow nitrogen purge was used to eliminate moisture int eh system. The stirrer was started and the mixture heated to 150° C. for a period of 16 hours to cause polymerization and equilibration of the mixture. The mixture was then cooled to 80° C. and 0.21 gm of propionic acid was added and the mixture stirred for 2 hours to neutralize. Then 0.24 gm of sodium bicarbonate and 15 gm of Supercell diatomacious earth were added with stirring and the mixture allowed to cool to room temperature. The mixture was then filtered through a 0.8 micrometer membrane and vacuum stripped to 190° C. at a pressure of 10 mm of mercury. There was very little material which was volatile under these conditions. The polymer was cooled to less than 80° C. while under vacuum. The copolymer had a viscosity of about 8050 centipose and a calculated vinyl content of about 0.17 weight percent.

Composition 51 was prepared by mixing a part A of 5.75 gm of silver flake of Example 1, 1.75 gm of silver powder of composition 43, 2.08 gm of the above copolymer, 0.4 gm of the platinum catalyst of composition 1, and 0.02 gm of the cure inhibitor of composition 2. Part B was prepared by mixing 3.5 gm of the silver flake, 4.0 gm of the silver powder, 1.08 gm of the copolymer, 0.5 gm of the adhesion additive of composition 1, and 0.92 gm of the methylhydrogen copolymer of composition 1. Parts A and B were combined at a 1 to 1 ratio by weight to give a curable composition of the same composition as composition 43, except the copolymer had 50 mole percent methylphenylsiloxy units rather than 30 mole percent.

For composition 52, composition 51 was repeated, except all of the silver was in the form of the silver flake of Example 1.

Each composition was prepared into test samples and tested in the same manner as in Example 1, with the results shown in Table V.

TABLE V

| Comp'n | Electrical 1 hr/150° C. | Resistance, 4 hr/200° C. | ohm-cm 25 hr/200° C. |
|---|---|---|---|
| 51 | 0.00044 | 0.00043 | 0.00046 |
| 52 | 0.00028 | 0.00022 | 0.00023 |

EXAMPLE 6

A composition was prepared having a lower silver particle content, the silver being in the form of flake.

Composition 61 was prepared using the same ingredients as in composition 4, Example 1, mixing for part A 6.5 gm of silver flake, 3.08 gm of the copolymer having 50 mole percent methylphenylsiloxy units, 0.4 gm of the platinum catalyst, and 0.02 gm of the cure inhibitor of composition 2, Example 1. Part B was prepared by mixing 6.5 gm of silver flake, 1.94 gm of the copolymer, 0.5 gm of adhesion additive, and 1.06 gm of the methylhydrogen copolymer. Parts A and B were then mixed at a 1 to 1 weight ratio to make the curable composition having 65 weight percent (15.0 volume percent) silver flake.

The composition was prepared into test samples and tested in the same manner as in Example 1, with the results shown in Table VI. Also shown is the result of composition 4, Example 1, a similar composition having 75 weight percent silver flake.

TABLE VI

| Comp'n | Silver Flake weight percent | Electrical 1 hr/150° C. | Resistance, 4 hr/200° C. | ohm-cm 25 hr/200° C. |
|---|---|---|---|---|
| 61 | 65 | 0.00070 | 0.00065 | 0.00070 |
| 4 | 75 | 0.00026 | 0.00025 | 0.00026 |

EXAMPLE 7

A series of compositions were prepared containing 75 weight percent of the silver flake in which the vinyl content of the polymer was varied.

Composition 71 was prepared by first preparing a part A by mixing 10 gm of the silver flake of Example 1, 2.77 gm of dimethylvinylsiloxy endblocked polydimethylsiloxane having about 7 dimethylsiloxy units per molecule, 0.53 gm of the platinum catalyst, and 0.03 gm of the cure inhibitor of composition 2. Part B was prepared by mixing 10 gm of the silver powder, 1.05 of the polymer of A, 0.46 gm of the adhesion additive of composition 1, and 1.81 gm of the methylhydrogen copolymer of composition 1. Parts A and B were then mixed in a 1 to 1 weight ratio to make the curable composition having 75 weight percent silver flake and 22.2 mole percent vinyl radical.

Composition 72 was prepared by first preparing a part A by mixing 10 gm of the silver flake of Example 1, 2.77 gm of polymer having $ViMe_2SiO_{\frac{1}{2}}$ and $SiO_2$ units, where Vi is vinyl radical, Me is methyl radical, and Si is silicon, in a ratio which gives 20.6 weight percent vinyl radicals (66.6 percent of the silicon atoms have vinyl attached), 0.53 gm of the platinum catalyst of composition 1, and 0.03 gm of the cure inhibitor of composition 2. Part B was prepared by mixing 10 gm of the silver flake, 0.18 gm of the polymer, 0.47 gm of the adhesion additive of composition 1, and 2.68 gm of the methylhydrogen crosslinker of composition 1. Parts A and B were then mixed at a 1 to 1 weight ratio to make a curable composition having 75 weight percent silver flake, 20.6 weight percent vinyl radical, and a ratio of hydrogen on silicon to vinyl on silicon of 0.8 to 1.

Composition 73 was prepared by first preparing a part A by mixing 10 gm of the silver flake of Example 1, 2.77 gm of polymer having the generic formula $(Me_2ViSiO_{\frac{1}{2}})_{1.38}(Me_3SiO_{178})_{0.42}(SiO_2)_{1.0}$ which gives a vinyl content of 5.8 weight percent, with 49.3 percent of the silicon atoms having vinyl attached, 0.53 gm of platinum catalyst of composition 1, and 0.03 gm of the cure inhibitor of composition 2. Part B was prepared by mixing 10 gm of the silver flake, 1.88 gm of the polymer, 0.47 gm of adhesion additive of composition 1 of Example 1, and 1.26 gm of the methylhydrogen crosslinker of composition 1 of Example 1. Parts A and B were then mixed in a 1 to 1 weight ratio to make a curable composition having 75 weight percent silver flake, 49.3 mole percent vinyl radical, and a ratio of hydrogen on silicon to vinyl on silicon of 0.6 to 1.

Composition 74 was prepared by first mixing a part A identical to that of composition 73. Part B was prepared by mixing 10 gm of the silver flake of Example 1, 1.60 gm of the polymer, 0.47 gm of the adhesion additive of composition 1 of Example 1, and 1.26 gm of hte methylhydrogen crosslinker of composition 1 of Example 1. Parts A and B were then mixed to make the curable composition having 75 weight percent silver flake, 49.3 mole percent vinyl radical, and a ratio of hydrogen on silicon to vinyl on silicon of 0.8 to 1.

Composition 75 was prepared by first mixing a part A identical to that of composition 73. Part B was prepared by mixing 10 gm of the silver flake of Example 1, 1.35 gm of the polymer, 0.47 gm of the adhesion additive of composition 1 of Example 1, and 1.51 gm of the methylhydrogen crosslinker of composition 1of Example 1. Parts A and B were then mixed in a 1 to 1 weight ratio to make the curable composition having 75 weight percent silver flake, 49.3 mole percent vinyl radical, and a ratio of hydrogen on silicon to vinyl on silicon of 1 to 1.

Each composition was prepared into test samples and tested in the same manner as in Example 1, with the results shown in Table VII.

TABLE VII

| Comp'n | Mole Percent Vinyl | SiH SiVi | Electrical Resistance, ohm-cm 1 hr/150° C. | 4 hr/200° C. | 25 hr/200° C. | Comp'n | Lap Shear pounds |
|---|---|---|---|---|---|---|---|
| 71 | 22.2 | 1/1 | 0.0005 | 0.0006 | 0.0006 | 71 | 113 |
| 72 | 66.6 | 0.8/1 | 0.00041 | —* | —* | 72 | 150 |
| 73 | 49.3 | 0.6/1 | 0.00018 | 0.00013 | 0.00018 | 73 | 83 |
| 74 | 49.3 | 0.8/1 | 0.00025 | 0.00019 | 0.00018 | 74 | 134 |

TABLE VII-continued

| Comp'n | Mole Percent Vinyl | SiH SiVi | Electrical Resistance, ohm-cm | | | Comp'n | Lap Shear pounds |
|---|---|---|---|---|---|---|---|
| | | | 1 hr/150° C. | 4 hr/200° C. | 25 hr/200° C. | | |
| 75 | 49.3 | 1/1 | 0.00035 | 0.00026 | 0.00029 | 75 | 241 |

*sample cracked

EXAMPLE 8

A series of compositions were prepared which were cured at room temperature.

Part A was prepared by mixing 10 gm of the silver flake of composition 1, of Example 1, 1.405 gm of the polymer of composition 21, of Example 2, 1.405 gm of the polymer of composition 31, of Example 3, and 0.53 gm of the platinum catalyst of composition 1 of Example 1. Part B was prepared by mixing 10 gm of the silver flake, 1.29 gm of each polymer, 0.44 gm of the methylhydrogensiloxane containing polydiorganosiloxane of composition 1 of Example 1, and 0.2 g of methylvinylcyclosiloxane. Parts A and B were then mixed in a 1 to 1 weight ratio to give a mixture, composition 81, having about 1.17 moles of SiH per mole of vinyl radical and 75 weight percent silver flake. The mixture was then allowed to cure into a disk, allowing 16 hours at room temperature. There was no conductivity present when tested as in the above samples.

Composition 82 was prepared in the same manner as for composition 81, except the silver powder of composition 43 of Example 4 was used in place of silver flake. The silver powder has a clean surface with no organic residue present such as is found on the surface of the silver flake. After the room temperature cure, the volume resistivity was about 0.0017 ohm-cm.

Composition 83 was prepared by mixing 10 gm of the silver flake of composition 81, 2.81 gm of the copolymer of composition 3 of Example 1, having 30 mole percent methylphenylsiloxy groups, and 0.53 gm of the platinum catalyst of composition 81 to give part A. Part B was prepared by mixing 10 gm of the silver flake, 2.58 gm of the copolymer, 0.56 gm of the methylhydrogensiloxy containing polydiorganosiloxane, and 0.2 gm of methylvinylcyclosiloxane. Parts A and B were stirred together and allowed to cure as in composition 81. There was no electrical conductivity when measured.

Composition 84 was prepared in the same manner as in composition 83, except the silver powder of composition 82 was used in place of the silver flake. After curing, the volume resistivity was about 0.0015 ohm-cm.

Each sample was heat aged for 25 hours at 200° C. and retested for conductivity. Compositions 81 and 83 and were still not conductive, while composition 82 had a volume resistivity of about 28.6 ohm-cm and composition 84 had a volume resistivity of about 0.022 ohm-cm. This example shows that it is necessary to use a silver particle having a clean surface in order to obtain electrical conductivity when curing at room temperature. This example also showas that a phenyl containing polymer gives a lower conductivity and better retention of electrical conductivity upon heat aging than does a methyl containing polymer.

That which is claimed is:

1. An electrically conductive silicone composition comprising
   (A) silicone polymer having greater than 5 percent of the silicon atoms having a phenyl radical attached, or having greater than 5 mole percent vinyl radicals, or having greater than 5 mole percent phenyl and vinyl radicals in combination, said polymer being curable through an addition reaction with a silicon hydride in the presence of a platinum catalyst,
   (B) from 12.5 to 50 volume percent of the total composition of silver particles or particles having an outer surface of silver,
   said composition being free of carbon black and having an electrical resistivity of less than $1 \times 10^{-2}$ ohm-cm, and which electrical resistivity is stable to thermal aging.

2. The electrically conductive silicone composition of claim 1 consisting essentially of
   (A) silicone polymer having greater than 5 percent of the silicon atoms having a phenyl radical attatched,
   (B) from 12.5 to 50 volume percent of the total composition of silver particles or particles having an outer surface of silver,
   the composition being free of carbon black, having an electrical resistivity of less than $1 \times 10^{-2}$ ohm-cm, and which electrical resistivity is stable to thermal aging.

3. The electrically conductive silicone composition of claim 1 consisting essentially of
   (A) silicone polymer having greater than 50 mole percent vinyl radicals,
   (B) from 12.5 to 50 volume percent of the total composition of silver particles or particles having an outer surface of silver,
   the composition being free of carbon black, having an electrical resistivity of less than $1 \times 10^{-2}$ ohm-cm, and which electrical resistivity is stable to thermal aging.

4. The electrically conductive silicone composition of claim 1 consisting essentially of
   (A) silicone polymer having greater than 5 mole percent phenyl and vinyl radicals in combination,
   (B) from 12.5 to 50 volume percent of the total composition of silver particles or particles having an outer surface of silver,
   the composition being free of carbon black, having an electrical resistivity of less than $1 \times 10^{-2}$ ohm-cm, and which electrical resistivity is stable to thermal aging.

5. The composition of claim 1 in which the surface of the silver particles or particles having an outer surface of silver, ingredient (B), are free of any organic processing aids.

6. The composition of claim 5 in which there is also present
   (C) a cure system for the polydiorganosiloxane (A) comprising
   (E) an organohydrogensiloxane having at least 2 SiH containg units per molecule, and
   (F) a platinum containing catalyst,
   the composition being curable at room temperature.

7. The composition of claim 1 in which there is also present
   (C) a cure system for the polyorganosiloxane (A).

8. The composition of claim 7 in which the cure system comprises
   (E) an organohydrogensiloxane having at least 2 SiH containing units per molecule, and
   (F) a platinum containing catalyst.

9. A method of improving the electrical conductivity of a composition comprising a silicone polymer and silver particles or particles having an outer surface of silver, said composition being free of carbon black, said method consisting of using a silicone polymer which has greater than 5 percent of the silicon atoms having an aromatic containing radical attached, or having greater than 5 more percent ethylenically unsaturated hydrocarbon radicals, or having greater than 5 mole percent aromatic containing radicals and ethylenically unsaturated hydrocarbon radicals in combination.

10. The method of claim 9 in which the aromatic containing radical is phenyl and the ethylenically unsaturated hydrocarbon radical is vinyl.

11. An electrically conductive silicone composition comprising
   (A) silicone polymer having units of the formula $R_aSiO_{4-a/2}$ where R is a hydrocarbon radical and a is from 0 to 3 inclusive, with greater than 5 mole percent of the R radicals being aromatic containing radicals or ethylenically unsaturated hydrocarbon radicals, or aromatic containing radicals and ethylenically unsaturated hydrocarbon radicals in combination, and
   (B) from 12.5 to 50 volume percent of the total composition of silver particles or particles having an outer surface of silver,
said composition having an electrical resistivity of less than $1 \times 10^{-2}$ ohm-cm, and which electrical resistivity is stable, to thermal aging the composition being free of carbon black.

12. An electrically conductive silicone composition consisting essentially of
   (A) silicone polymer having units of the formula $R_aSiO_{4-a/2}$ where R is a hydrocarbon radical and a is from 0 to 3 inclusive, with greater than 5 mole percent of the R radicals being aromatic containing radicals or ethylenically unsaturated hydrocarbon radicals, or aromatic containing radicals and ethylenically unsaturated hydrocarbon radicals in combination, said polymer being curable through an addition reaction with a silicon hydride in the presence of a platinum catalyst,
   (B) from 12.5 to 50 volume percent of the total composition of silver particles or particles having an outer surface of silver,
   (E) an organohydrogensiloxane having at least 2 SiH containing units per molecule, and
   (F) a platinum containing catalyst,
the composition being curable at room temperature, and said composition having an electrical resistivity of less than $1 \times 10^{-2}$ ohm-cm, and which electrical resistivity is stable to thermal aging.

13. A method of improving the electrical conductivity of a composition consisting essentially of a silicone polymer and silver particles or particles having an outer surface of silver, said method consisting of mixing
   (A) silicone polymer having greater than 5 percent of the silicon atoms having an aromatic containing radical attached, or having greater than 5 mole percent ethylenically unsaturated hydrocarbon radicals, or having greater than 5 mole percent aromatic containing radicals and ethylenically unsaturated hydrocarbon radicals in combination,
   (B) from 12.5 to 50 volume percent of the total composition of silver particles or particles having an outer surface of silver,
said composition having an electrical resistivity of less than $1 \times 10^{-2}$ ohm-cm, and which electrical resistivity is stable to thermal aging.

14. A method of improving the electrical conductivity of a composition comprising a silicone polymer and silver particles or particles having an outer surface of silver, said method consisting of mixing
   (A) silicone polymer having greater than 5 percent of the silicon atoms having an aromatic containing radical attached, or having greater than 5 mole percent ethylenically unsaturated hydrocarbon radicals, or having greater than 5 mole percent aromatic containing radicals and ethylenically unsaturated hydrocarbon radicals in combination,
   (B) from 12.5 to 50 volume percent of the total composition of silver particles of particles having an outer surface of silver, said composition being free of carbon black,
said composition having an electrical resistivity of less than $1 \times 10^{-2}$ ohm-cm, and which electrical resistivity is stable to thermal aging.

15. The cured composition of claim 12.

16. An electrically conductive, two part silicone composition consisting essentially of
   (A) silicone polymer having units of formula $R_aSiO_{4-a/2}$ where R is a hydrocarbon radical and a is from 0 to 3 inclusive, with greater than 5 mole percent of the R radicals being aromatic containing radicals or ethylenically unsaturated hydrocarbon radicals, or aromatic containing radicals and ethylenically unsaturated hydrocarbon radicals in combination, said polymer being curable through an addition reaction with a silicon hydride in the presence of a platinum catalyst,
   (B) from 12.5 to 50 volume percent of the total composition of silver particles or particles having an outer surface of silver,
   (E) an organohydrogensiloxane having at least 2 SiH containing units per molecule, and
   (F) a platinum containing catalyst,
the composition being free of carbon black and having an electrical resistivity of less than $1 \times 10^{-2}$ ohm-cm, and which electrical resistivity is stable to thermal aging; the first part containing part of (A) and (B), and (F) and the second part containing the remainder of (A) and (B) and (E).

* * * * *